United States Patent
Rao et al.

(10) Patent No.: US 10,104,422 B2
(45) Date of Patent: Oct. 16, 2018

(54) MULTIMEDIA PLAYING CONTROL METHOD, APPARATUS FOR THE SAME AND SYSTEM

(71) Applicant: Sony Corporation, Tokyo (JP)

(72) Inventors: Yingyuan Rao, Beijing (CN); Dahai Liu, Beijing (CN); Hui Li, Beijing (CN)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 51 days.

(21) Appl. No.: 14/390,825

(22) PCT Filed: Jan. 29, 2014

(86) PCT No.: PCT/IB2014/000083
§ 371 (c)(1),
(2) Date: Oct. 6, 2014

(87) PCT Pub. No.: WO2015/052559
PCT Pub. Date: Apr. 16, 2015

(65) Prior Publication Data
US 2015/0382054 A1 Dec. 31, 2015

(30) Foreign Application Priority Data
Oct. 9, 2013 (CN) .......................... 2013 1 0467305

(51) Int. Cl.
*H04N 21/41* (2011.01)
*H04N 21/436* (2011.01)
(Continued)

(52) U.S. Cl.
CPC ... *H04N 21/43615* (2013.01); *H04N 21/4126* (2013.01); *H04N 21/41407* (2013.01);
(Continued)

(58) Field of Classification Search
CPC . H04N 21/214; H04N 21/436; H04N 21/4384
See application file for complete search history.

(56) References Cited

U.S. PATENT DOCUMENTS 7,240,359 B1 * 7/2007 Sie ..................... H04N 7/17318
348/E7.071
7,810,647 B2 * 10/2010 Ganesan ............ H04N 7/17336
209/203

(Continued)

FOREIGN PATENT DOCUMENTS

CN 103281294 A 9/2013

OTHER PUBLICATIONS

International Search Report and Written Opinion from corresponding International Application No. PCT/IB2014/000083, dated Aug. 21, 2014.

(Continued)

*Primary Examiner* — Fernando Alcon
(74) *Attorney, Agent, or Firm* — Renner, Otto, Boisselle & Sklar, LLP

(57) ABSTRACT

Embodiments of the present disclosure provide a multimedia playing control method and apparatus and system. The multimedia playing control method includes: obtaining first multimedia content data according to source information of multimedia content data; and transmitting the source information of multimedia content data and all or part of the first multimedia content data. With the embodiments of the present disclosure, multimedia content data that has been buffered to the local is transmitted while transmitting multimedia source information, thereby reducing amount of data needing to be buffered again and the time of waiting for the buffering.

15 Claims, 4 Drawing Sheets

(51) Int. Cl.
  *H04N 21/414* (2011.01)
  *H04N 21/422* (2011.01)
  *H04N 21/433* (2011.01)
  *H04N 21/44* (2011.01)
  *H04N 21/462* (2011.01)
  *H04N 21/858* (2011.01)

(52) U.S. Cl.
  CPC ..... *H04N 21/4222* (2013.01); *H04N 21/4331* (2013.01); *H04N 21/44004* (2013.01); *H04N 21/4622* (2013.01); *H04N 21/8586* (2013.01)

(56) References Cited

U.S. PATENT DOCUMENTS

| | | | | |
|---|---|---|---|---|
| 8,392,583 | B2* | 3/2013 | Bijwaard | H04N 21/6405 709/227 |
| 8,615,164 | B1* | 12/2013 | Kotab | H04N 5/765 386/292 |
| 8,849,899 | B1* | 9/2014 | L'Heureux | H04L 29/08 709/203 |
| 2002/0100052 | A1* | 7/2002 | Daniels | G11B 27/024 725/87 |
| 2004/0117845 | A1 | 6/2004 | Karaoguz et al. | |
| 2006/0026663 | A1* | 2/2006 | Kortum | H04N 7/17318 725/134 |
| 2006/0037037 | A1* | 2/2006 | Miranz | H04N 7/17318 725/2 |
| 2006/0233519 | A1 | 10/2006 | Narita | |
| 2007/0174471 | A1* | 7/2007 | Van Rossum | H04L 29/06 709/229 |
| 2008/0059631 | A1* | 3/2008 | Bergstrom | H04N 7/17318 709/224 |
| 2008/0168133 | A1 | 7/2008 | Osborne | |
| 2008/0235733 | A1* | 9/2008 | Heie | H04N 7/163 725/46 |
| 2008/0301745 | A1* | 12/2008 | Liu | H04N 21/2221 725/110 |
| 2009/0037968 | A1* | 2/2009 | Liu | H04N 7/17309 725/114 |
| 2009/0059865 | A1* | 3/2009 | Zhang | H04W 36/02 370/331 |
| 2009/0232481 | A1 | 9/2009 | Baalbergen et al. | |
| 2010/0154021 | A1* | 6/2010 | Howarter | H04N 21/4126 725/141 |
| 2010/0198944 | A1* | 8/2010 | Ho | H04L 12/189 709/217 |
| 2012/0158984 | A1 | 6/2012 | Maitre et al. | |
| 2014/0105561 | A1* | 4/2014 | Chen | H04N 21/647 386/200 |
| 2014/0282767 | A1* | 9/2014 | Tirpak | H04N 21/414 725/93 |
| 2015/0350714 | A1* | 12/2015 | Normile | H04N 21/433 725/32 |

OTHER PUBLICATIONS

"DLNA for HD Video Streaming in Home Networking Environments", Jun. 30, 2011 (Jun. 30, 2011), XP55126385, Retrieved from the Internet: URL: http://web.archive.org/web/20110630143 952/ http://www.dlna.org/about_us/about/DLNAWhitepaper.pdf [retrieved on Jul. 2, 2014].

* cited by examiner

[Fig. 1]
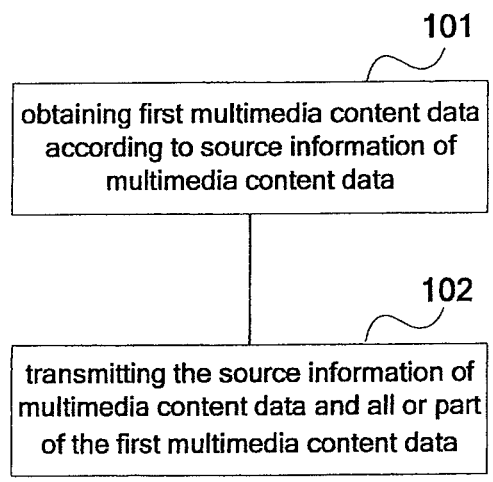
[Fig. 2]
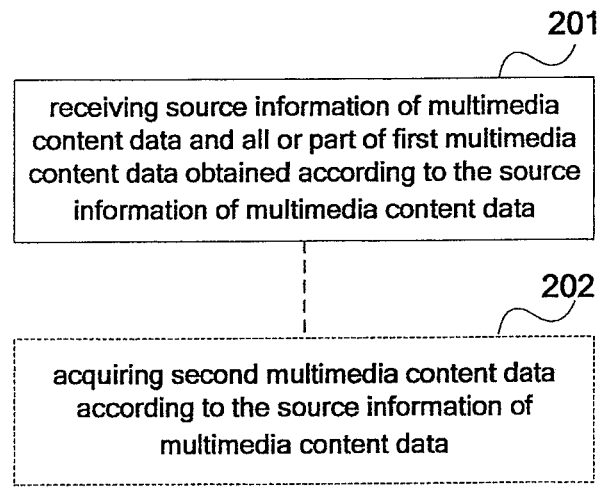

[Fig. 3]
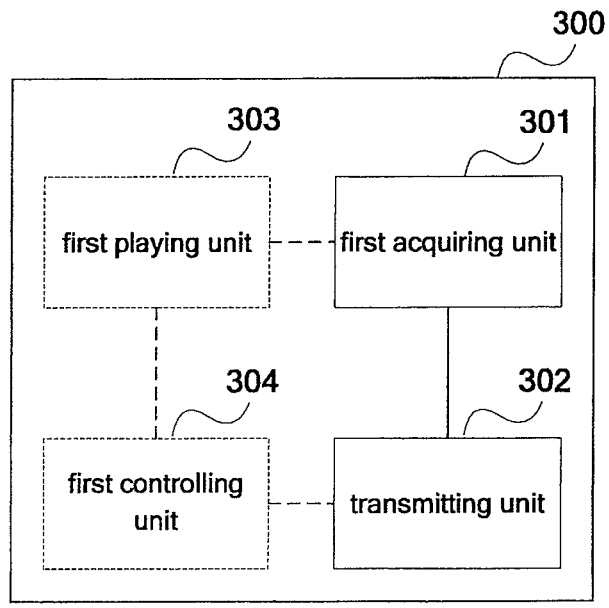
[Fig. 4]
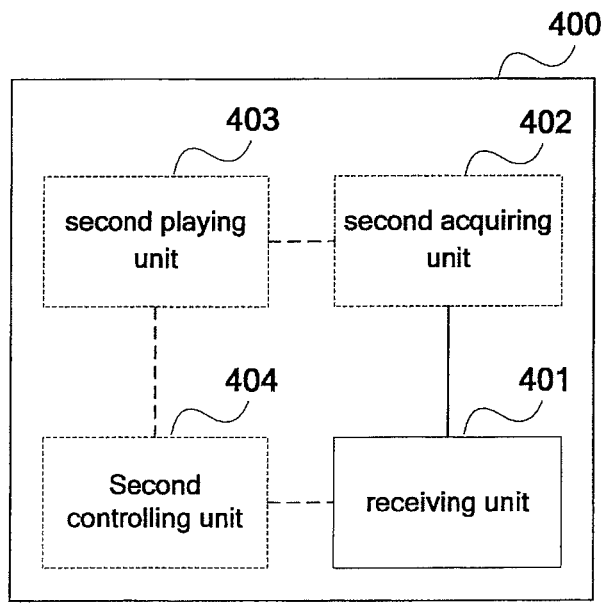

[Fig. 5]
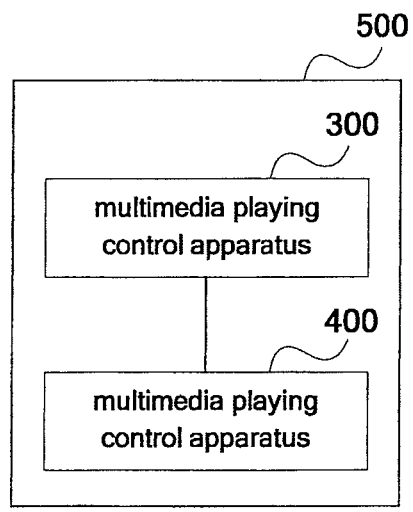
[Fig. 6]
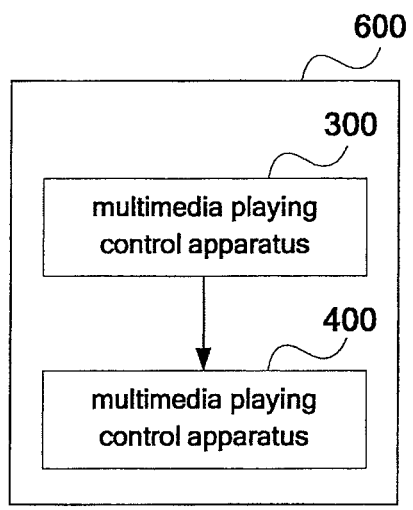

[Fig. 7]
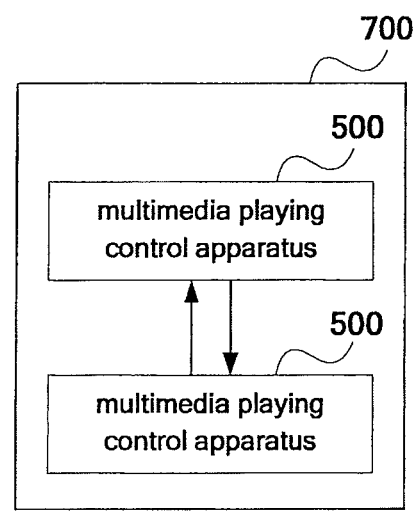

MULTIMEDIA PLAYING CONTROL METHOD, APPARATUS FOR THE SAME AND SYSTEM

TECHNICAL FIELD

The present disclosure relates to the field of multimedia control technologies, and in particular to a multimedia playing control method, apparatus and system based on a digital living network alliance (DLNA) technology.

CROSS-REFERENCE TO RELATED APPLICATION AND PRIORITY CLAIM

This application is a national phase of International Application No. PCT/US2012/000083, filed Jan. 29, 2014 in the English language, which claims priority from CN201310467305.9, filed Oct. 9, 2013, the entire disclosures of which are hereby incorporated herein by reference.

BACKGROUND ART

The DLNA was launched by Sony, Intel, and Microsoft, etc., and was intended to address to interconnection and intercommunication of wireless networks and wired networks of personal computers, consumer electronics, and mobile equipment, making limitless share and increase of digital media and content service possible.

The DLNA technology enables various devices in a home network (computers, intelligent TV, and mobile phones, etc.) to communicate mutually as per the DLNA standard and share multimedia resources. A DLNA system comprises components of a media server, a media player and a media controller, and may be simply described as: the media controller controls the media player to play the contents in the media server. For example, if a TV set and a personal computer belong to the same DLNA home network, the TV set may have access to the mainstream media documents in the personal computer, without any complex process of configuration.

It should be noted that the above description of the background art is merely provided for clear and complete explanation of the present disclosure and for easy understanding by those skilled in the art. And it should not be understood that the above technical solution is known to those skilled in the art as it is described in the background of the present disclosure.

SUMMARY

In the implementation of the existing DLNA technology, the inventors found that in using a mobile terminal, such as in intelligent mobile phone, etc., to transmit instructions for playing multimedia content data to a displaying terminal, such as an intelligent TV set, etc., the network address of the multimedia content data is transmitted to the displaying terminal, and the displaying terminal buffers the multimedia content data to the local and plays in the displaying terminal; however, as it usually takes tens of minutes by the displaying terminal in buffering the multimedia content data to the local, the multimedia content data can only be continued to be played in the displaying terminal after waiting for the buffering time, and better users' experiences cannot be obtained.

Embodiments of the present disclosure provide a multimedia playing control method, apparatus and system, with an object being to reduce time of waiting for buffering after a playing terminal of multimedia content data receives a playing control instruction.

According to one aspect of an embodiment of the present disclosure, there is provided a multimedia playing control method, including: obtaining first multimedia content data according to source information of multimedia content data; and transmitting the source information of multimedia content data and all or part of the first multimedia content data.

According to another aspect of an embodiment of the present disclosure, the control method may further include playing the first multimedia content data.

According to a further aspect of an embodiment of the present disclosure, part of the first multimedia content data to be transmitted may be determined according to a progress of the playing.

According to further still another aspect of an embodiment of the present disclosure, the source information of multimedia content data and all or part of the first multimedia content data may be transmitted via a local area network.

According to further still another aspect of an embodiment of the present disclosure, the source information of multimedia content data may include a network address of the first multimedia content data and/or ID and a storage path of device providing the first multimedia content data.

According to further still another aspect of an embodiment of the present disclosure, the control method may further include transmitting playing control information, the playing control information being used to control playing of the multimedia content data.

According to further still another aspect of an embodiment of the present disclosure, the playing control information may include playing progress information, the playing progress information being used to set a starting point of the playing.

According to further still another aspect of tan embodiment of the present disclosure, there is provided a multimedia playing control method, including receiving source information of multimedia content data and all or part of first multimedia content data obtained according to the source information of multimedia content data.

According to further still another aspect of an embodiment of the present disclosure, the control method may further includes: obtaining second multimedia content data according to the source information of multimedia content data.

According to further still another aspect of an embodiment of the present disclosure, the control method may further includes: playing the second multimedia content data and/or all or part of the first multimedia content data.

According to further still another aspect of an embodiment of the present disclosure, the control method may further includes: receiving playing control information, and controlling the playing according to the playing control information.

According to further still another aspect of an embodiment of the present disclosure, the playing control information may include playing progress information, the playing progress information being used to set a starting point of the playing.

According to further still another aspect of an embodiment of the present disclosure, there is provided a first multimedia playing control apparatus, including: a first acquiring unit configured to obtain first multimedia content data according to source information of multimedia content data; and a transmitting unit configured to transmit the source information of multimedia content data and all or part of the first multimedia content data.

According to further still another aspect of an embodiment of the present disclosure, there is provided a second multimedia playing control apparatus, including a receiving unit configured to receive source information of multimedia content data and all or part of first multimedia content data obtained according to the source information of multimedia content data.

According to further still another aspect of an embodiment of the present disclosure, there is provided a multimedia playing control system, including the first and second multimedia playing control apparatuses as described in the embodiments of the present disclosure.

An advantage of the embodiments of the present disclosure resides in that multimedia content data that has been buffered to the local is transmitted while transmitting multimedia source information, thereby reducing amount of data needing to be buffered again and the time of waiting for the buffering.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present disclosure. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF DRAWINGS

The drawings are included to provide further understanding of the present disclosure, which constitute a part of the specification and illustrate the preferred embodiments of the present disclosure, and are used for setting forth the principles of the present disclosure together with the description. The same or similar element are represented with the same reference number throughout the drawings, and "primed" reference numerals represent elements that are the same or similar to elements that are designed by the same unprimed reference numeral, and so on. In the drawings:

FIG. 1 is a flowchart of the multimedia playing control method of Embodiment 1 of the present disclosure;

FIG. 2 is a flowchart of the multimedia playing control method of Embodiment 2 of the present disclosure;

FIG. 3 is a schematic diagram of the structure of the multimedia playing control apparatus of Embodiment 3 of the present disclosure;

FIG. 4 is a schematic diagram of the structure of the multimedia playing control apparatus of Embodiment 4 of the present disclosure;

FIG. 5 is a schematic diagram of the structure of the multimedia playing control apparatus of Embodiment 5 of the present disclosure;

FIG. 6 is a schematic diagram of the structure of the multimedia playing control system of Embodiment 6 of the present disclosure; and FIG. 7 is another schematic diagram of the structure of the multimedia playing control system of Embodiment 6 of the present disclosure.

DESCRIPTION OF EMBODIMENTS

Various embodiments of the present disclosure are described as follows with reference to the drawings. These embodiments are illustrative only, and are not intended to limit the present disclosure.

Embodiment 1

Embodiment 1 of the present disclosure provides a multimedia playing control method, which shall be described starting from a transmission end.

FIG. 1 is a flowchart of the multimedia playing control method of Embodiment 1 of the present disclosure. As shown in FIG. 1, the multimedia playing control method includes:

step 101: obtaining first multimedia content data according to source information of multimedia content data; and step 102: transmitting the source information of multimedia content data and all or part of the first multimedia content data.

In this embodiment, a transmission end may be a mobile terminal, such as a smart phone, and a tablet computer, etc., and may also be an electronic device, such as a smart TV set, a desktop computer display, and audio equipment, etc. The multimedia content data are not limited to video data, and may also be other data, such as a picture, music and/or a file.

In step 101, the transmission end buffers the first multimedia content data to the transmission end according to source information of multimedia content data. The source information of multimedia content data may be in various forms according to different sources of first multimedia content data. For example, if the transmission end obtains the multimedia content data from a wide area network, such as obtaining the multimedia content data from a provider of multimedia resources of the Internet, it needs to know a network address of the multimedia content data in the wide area network, i.e. a uniform resource locator (URL). Hence, the URL may be taken as the source information of the multimedia content data; when the transmission end obtains the multimedia content data from the local area network, an address of the multimedia content data in the local area network may be taken as its source information; and when the transmission end obtains the multimedia content data from another equipment, the source information of the media resource may consist of equipment ID and storage path of the other equipment. In some modes of implementation, the source information of the multimedia content data may be a combination of the above.

The transmission end may play the first multimedia content data buffered to the transmission end, and continues to buffer the remaining multimedia content data to the transmission end while playing. The transmission end may not play the first multimedia content data, and may only store the first multimedia content data buffered to the local.

In step 102, the transmission end may transmit the source information of the multimedia content data and all or part of the first multimedia content data to a receiving end.

In this embodiment, the transmission end may transmit the source information of the multimedia content data and all or part of the first multimedia content data to the receiving end according to an instruction for transmission. In a particular mode of implementation, the instruction for transmission may be for example from a "throw" function of a user interface (UI). That is, by using the "throw" function, the user selects the receiving end connected to the transmission end, and transmits corresponding data to the receiving end.

In this embodiment, the transmission end may also determine which part of the first multimedia content data is to be transmitted according to a progress of playing of the first multimedia content data by the transmission end. In a particular mode of implementation, the transmission end may determine the data in the first multimedia content data that is not played according to the progress of playing, and transmit data that is not played to the receiving end, thereby reducing the amount of data transmitted to the receiving end, and saving time of transmission.

In this embodiment, the transmission end may also transmit all the first multimedia content data to the receiving end. In this embodiment, the receiving end may be a mobile terminal, such as a smart phone, and a tablet computer, etc., and may also be an electronic device, such as a smart TV set, a desktop computer display, and audio equipment, etc.

There may be multiple manners of connection between the transmission end and the receiving end. For example, the transmission end and the receiving end may be in the same wired or wireless local area network, and a connection path may be established between the transmission end and the receiving end by a router of the local area network; or a connection path may be established between the transmission end and the receiving end via a wide area network; or a connection path may be established between the transmission end and the receiving end via Bluetooth terminals, near field communication (NFC) terminals, or wired ports of themselves, without needing to be supported by another equipment.

In using the above manners of connection, in order to make a connection path be more safe, access authentication may be performed between the transmission end and the receiving end, which may be performed before the establishment of the connection path, and may also be performed during the establishment of the connection path. The relevant art may be referred to for performing the access authentication between the transmission end and the receiving end and a particular manner of data transmission in each manner of connection, which shall not be described further in this embodiment of the present disclosure.

In this embodiment, the transmission end may transmit the source information of the multimedia content data and all or part of the first multimedia content data to the receiving end via the above-described connection paths at any time, for example, during the process that the transmission end buffers the first multimedia content data to the local and performs playing, or the moment when the transmission end buffers the first multimedia content data to the local but not starts to play, or the moment when the transmission end is connected to the first multimedia content data but not starts to buffer.

In this embodiment, as the transmission end transmits the source information of the multimedia content data and the first multimedia content data to the receiving end, the transmission end is enabled to buffer second multimedia content data to the local from the wide area network, the local area network or other equipment according to the source information of the multimedia content data; and as the first multimedia content data are received from the receiving end, the transmission end may not to buffer the first multimedia content data, thereby reducing the amount of data transmitted to the receiving end, and saving time of transmission. In particular implementation, the time of buffering may be reduced to within 5 seconds.

In a particular mode of implementation, if the transmission end has obtained the first multimedia content data by buffering, the transmission end may transmit all the first multimedia content data to the receiving end. Hence, the receiving end may play the first multimedia content data received from the transmission end, and continues to buffer the second multimedia content data, thereby reducing the time of waiting.

In some other modes of implementation, if the first multimedia content data obtained by the transmission end by buffering contains all the multimedia content data, all the multimedia content data will be transmitted to the receiving end. Therefore, the receiving end needs not to perform any buffering operation.

If no multimedia content data is buffered at the transmission end, the transmission end may not transmit the multimedia content data to the receiving end; and correspondingly, the receiving end may buffer the multimedia content data from the beginning.

Furthermore, the transmission end may transmit playing control information to the receiving end, and the playing control information may control the playing of the multimedia content data by the receiving end. In a particular mode of implementation, the transmission end may transmit, for example, playing control information of starting and pausing of the playing, adjustment of volume, and selection of a program, etc., at the receiving end. Thus, the transmission end is equivalent to a remote controller, which remotely controls the playing of the multimedia content data received by the receiving end.

In another particular mode of implementation, the playing control information may further possess playing progress information, which may be used to control a starting point of the playing of the multimedia content data. In particular implementation, the playing progress information may be the moment to which the stop of the playing of the multimedia content data at the transmission end corresponds, from which the receiving end continues to play the multimedia content data; or a starting time of playing at the receiving end may be set at the transmission end, so as to control the playing at the receiving end.

It can be seen from the above embodiment that the transmission end transmits to the receiving end the source information of the multimedia content data and the multimedia content data that has been buffered to the receiving end. Therefore, the receiving end may not buffer this part of multimedia content data from the transmission end, thereby reducing the amount of buffering at the receiving end, and saving time of waiting for buffering.

Embodiment 2

Embodiment 2 of the present disclosure provides a multimedia playing control method, which shall be described starting from a receiving end.

FIG. 2 is a flowchart of the multimedia playing control method of Embodiment 2 of the present disclosure. As shown in FIG. 2, the multimedia playing control method includes:

step 201: receiving source information of multimedia content data and all or part of first multimedia content data obtained according to the source information of multimedia content data.

In this embodiment, the description of the receiving end, the transmission end and the manner of data transmission between the transmission end and the receiving end is the same as that in Embodiment 1, which shall not be described herein any further.

In step 201, the transmission end receives all or part of the first multimedia content data and the source information of the multimedia content data from the receiving end. In a particular mode of implementation, when the receiving end and the transmission end are in the same local area network, the source information of the multimedia content data and the first multimedia content data buffered to the transmission end may be received from the receiving end via a router of the local area network. If the transmission end does not buffer any multimedia content data, the multimedia content data may be not transmitted, and only the source information of the multimedia content data is transmitted. The source information of the multimedia content data may be a URL of the multimedia content data in the wide area network, or may be an address of the multimedia content data in the local area network, or may be information consisting of equipment ID and storage path of another device providing the multimedia content data, or a combination thereof. Embodiment 1 may be referred to for details, which shall not be described herein any further.

In this embodiment, there may further be step 202. In step 202, the receiving end acquires second multimedia content data according to the source information of multimedia content data. In a particular mode of implementation, the receiving end may access to the webpage where the second multimedia content data is stored according to the URL of the multimedia content data, establish connection with the second multimedia content data, and buffer the second multimedia content data to the local. As the receiving end has received the first multimedia content data buffered by the transmission end, the receiving end may not buffer the part of the first multimedia content data again, and skip over this part of data and buffer the second multimedia content data to the local, so as to obtain complete multimedia content data, thereby reducing the amount of buffering at the receiving end, saving time of waiting for buffering, and improving users' experiences.

In this embodiment, if the transmission end has obtained the first multimedia content data by buffering, it may transmit the first multimedia content data to the receiving end. Therefore, the receiving end may directly play this part of the first multimedia content data received from the transmission end, and continue to buffer the second multimedia content data, thereby reducing waiting.

In particular implementation, if the transmission end does not buffer any data, the receiving end may buffer the multimedia content data from the beginning according to the URL.

Furthermore, if the first multimedia content data obtained by the transmission end by buffering contain all the multimedia content data, if the receiving end receives the multimedia content data transmitted by the transmission end, the receiving end may not buffer data again from the URL, but directly store or play the multimedia content data from the transmission end, thereby storing or playing the multimedia content data more quickly.

Furthermore, in other modes of implementation, the receiving end may not buffer the second multimedia content data according to other control instructions.

In this embodiment, the receiving end may play only all or part of the first multimedia content data from the transmission end, or only the second multimedia content data obtained by buffering according to the source information of multimedia content data, or consecutively play the multimedia content data after combining all or part of the first multimedia content data from the transmission end and the second multimedia content data obtained by buffering.

In playing the multimedia content data, the receiving end may play in a manner of playing of itself, such as a preset manner of cyclic playing at the receiving end, and a manner of playing in an order of list, etc.; and may playing according to received playing control information. In a particular mode of implementation, the playing control information may be from, for example, the transmission end. In such a scenario, the function of the transmission end may be equivalent to a remote controller of the receiving end. In particular implementation, the playing control information from the transmission end may be, for example, playing progress information used to set a starting point of the playing. Detailed description of the playing control information is the same as that in Embodiment 1, which shall not be described herein any further.

It can be seen from the above embodiment that the receiving end receives the source information of the multimedia content data and the multimedia content data that has been buffered to the transmission end. Therefore, the receiving end may not buffer this part of multimedia content data from the transmission end, thereby reducing the amount of buffering at the receiving end, and saving time of waiting for buffering.

Embodiment 3

Embodiment 3 of the present disclosure provides a multimedia playing control apparatus, corresponding to the multimedia playing control method as described in Embodiment 1, with the parts identical to those in Embodiment 1 being not going to be described any further. The multimedia playing control apparatus of this embodiment is at a transmission end.

FIG. 3 is a schematic diagram of the structure of the multimedia playing control apparatus of Embodiment 3 of the present disclosure. As shown in FIG. 3, the multimedia playing control apparatus 300 includes:

a first acquiring unit 301 configured to obtain first multimedia content data according to source information of multimedia content data; and a transmitting unit 302 configured to transmit the source information of multimedia content data and all or part of the first multimedia content data.

Refer to the operational modes of corresponding steps in Embodiment 1 for operational modes of the units in this embodiment, which shall not be described herein any further. It should be noted that only part of components of the multimedia playing control apparatus 300 related to this embodiment are shown, and the relevant art may be referred to for other part of the multimedia playing control apparatus that are not shown.

Furthermore, the multimedia playing control apparatus 300 may include a first playing unit 303 and a first controlling unit 304, wherein, the first playing unit 303 may be configured to play multimedia content data. In a particular mode of implementation, the first playing unit 303 may include, for example, a decoder for decoding audio and/or video data and a display and/or a loudspeaker, etc. And the first controlling unit 304 may be configured to generate control information for controlling the first playing unit 303, and may further be configured to generate the above-described playing control information.

It can be seen from the above embodiment that the multimedia playing control apparatus 300 at the transmission end transmits to the receiving end the source information of the multimedia content data and the multimedia content data that has been buffered to the transmission end. Therefore, the receiving end may not buffer this part of multimedia content data from the transmission end, thereby reducing the amount of buffering at the receiving end, and saving time of waiting for buffering.

Embodiment 4

Embodiment 4 of the present disclosure provides a multimedia playing control apparatus, corresponding to the multimedia playing control method as described in Embodiment 2, with the parts identical to those in Embodiment 2 being not going to be described any further. The multimedia playing control apparatus of this embodiment is at a receiving end.

FIG. 4 is a schematic diagram of the structure of the multimedia playing control apparatus of Embodiment 4 of the present disclosure. As shown in FIG. 4, the multimedia playing control apparatus 400 includes:

a receiving unit 401 configured to receive source information of multimedia content data and all or part of first multimedia content data obtained according to the source information of multimedia content data.

Refer to the operational modes of corresponding steps in Embodiment 2 for operational modes of the units in this embodiment, which shall not be described herein any further. It should be noted that only part of components of the multimedia playing control apparatus 400 related to this embodiment are shown, and the relevant art may be referred to for other part of the multimedia playing control apparatus that are not shown.

Furthermore, the multimedia playing control apparatus 400 may include a second acquiring unit 402, a second playing unit 403 and a second controlling unit 404. The second acquiring unit 402 may be configured to acquire second multimedia content data according to source information of multimedia content data; and the second playing unit 403 may be configured to play multimedia content data. In a particular mode of implementation, the second playing unit 403 may include, for example, a decoder for decoding audio and/or video data and a display and/or a loudspeaker, etc. And the second controlling unit 404 may be configured to generate control information for controlling the second playing unit 403, and may further be configured to perform playing control on the second playing unit 403 according to the above received playing control information.

It can be seen from the above embodiment that the multimedia playing control apparatus 400 at the receiving end receives from the transmission end the source information of the multimedia content data and the multimedia content data that has been buffered to the transmission end. Therefore, the multimedia playing control apparatus 400 may not buffer this part of multimedia content data from the transmission end, thereby reducing the amount of buffering at the receiving end, and saving time of waiting for buffering.

Embodiment 5

Embodiment 5 of the present disclosure provides a multimedia playing control apparatus. As shown in FIG. 5, the multimedia playing control apparatus 500 has the multimedia playing control apparatus 300 as described in Embodiment 3 and the multimedia playing control apparatus 400 as described in Embodiment 4 at the same time.

In a particular mode of implementation, the first acquiring unit 301 and the second acquiring unit 402 may be the same acquiring unit, the first playing unit 303 and the second playing unit 403 may be the same playing unit, and the first controlling unit 304 and the second controlling unit 404 may be the same controlling unit.

In this embodiment, the multimedia playing control apparatus 500 may be used either at the receiving end or the transmission end. Therefore, it not only has the functions of the multimedia playing control apparatuses 300 and 400, but also is able to achieve mutual transmission of multimedia content data and mutual playing control.

Embodiment 6

Embodiment 6 of the present disclosure provides a multimedia playing control system. As shown in FIG. 6, the multimedia playing control system 600 at least includes the multimedia playing control apparatus 300 as described in Embodiment 3 and the multimedia playing control apparatus 400 as described in Embodiment 4.

In the multimedia playing control system 600, the multimedia playing control apparatus 300 at the transmission end performs playing control on the multimedia playing control apparatus 400 at the receiving end.

FIG. 7 is another schematic diagram of the structure of the multimedia playing control system of Embodiment 6 of the present disclosure. As shown in FIG. 7, the multimedia playing control system 700 at least includes two multimedia playing control apparatuses 500 as described in Embodiment 5.

In the above embodiment, the multimedia playing control apparatus 500 may execute the functions of both the transmission end and the receiving end. Therefore, in the multimedia playing control system 700, mutual transmission of multimedia content data between multiple multimedia playing control apparatuses 500 and mutual playing control may be achieved.

An embodiment of the present disclosure further provides a computer-readable program, wherein when the program is executed in electronic equipment, the program enables the computer to carry out the multimedia playing control method as described in Embodiment 1 in the electronic equipment.

An embodiment of the present disclosure further provides a storage medium in which a computer-readable program is stored, wherein the computer-readable program enables the computer to carry out the multimedia playing control method as described in Embodiment 1 in electronic equipment.

The preferred embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present disclosure include other implementations, wherein the functions may be executed in manners different from those shown or discussed, including executing the functions according to the related functions in a substantially simultaneous manner or in a reverse order, which should be understood by those skilled in the art to which the present disclosure pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present disclosure. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present disclosure by using the devices.

Particular embodiments of the present disclosure have been disclosed herein. Those skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present disclosure has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the a particular feature of the present disclosure is described with respect to only one or more of the illustrated embodiments, such a feature may be combined with one or more other features of other embodiments as desired and in consideration of advantageous aspects of any given or particular application.

The invention claimed is:

1. A multimedia playing control method, comprising:
   obtaining with a mobile terminal first multimedia content data according to source information of multimedia content data;
   playing the first multimedia content data;
   determining by the mobile terminal, according to a progress of the playing, an unplayed portion of the first multimedia content, wherein the unplayed portion comprises a portion of the first multimedia content that has not been played;
   transmitting by the mobile terminal (i) the source information of multimedia content data and (ii) the unplayed portion of the first multimedia content data as a buffer; and
   receiving by a receiving unit the source information of multimedia content data and the unplayed portion of the first multimedia content data transmitted by the mobile terminal;
   wherein the receiving unit is configured to play the first multimedia content data based on the received unplayed portion of the first multimedia content data and based on the received source information, such that the receiving unit:
   uses the received unplayed portion of the first multimedia content as a buffer; and
   does not obtain according to the received source information the unplayed portion of the first multimedia content.

2. The control method according to claim 1, wherein the source information of multimedia content data and unplayed portion of the first multimedia content data are transmitted from the mobile terminal to the receiving unit via a local area network.

3. The control method according to claim 1, wherein the source information of multimedia content data comprises a network address of the first multimedia content data and/or ID and a storage path of device providing the first multimedia content data.

4. The control method according to claim 1, wherein the control method further comprises transmitting from the mobile terminal playing control information, and using the playing control information to control playing of the multimedia content data.

5. The control method according to claim 4, wherein the playing control information comprises playing progress information, and wherein the playing progress information is used to set a starting point of the playing.

6. A multimedia playing control method, comprising,
a receiving unit receiving from a mobile terminal source information of multimedia content data and an unplayed portion of first multimedia content data transmitted by the mobile terminal;
the receiving unit playing the first multimedia content data based on the received unplayed portion of the first multimedia content data and based on the received source information, such that the receiving unit:
uses the received unplayed portion of the first multimedia content as a buffer; and
does not obtain according to the received source information the unplayed portion of the first multimedia content.

7. The control method according to claim 6, wherein the control method further comprises the receiving unit obtaining second multimedia content data according to the source information of multimedia content data.

8. The control method according to claim 7, wherein the control method further comprises playing with the receiving unit the second multimedia content data and/or the unplayed portion of the first multimedia content data.

9. The control method according to claim 8, wherein the control method further comprises the receiving unit receiving playing control information and controlling playing according to the playing control information.

10. The control method according to claim 9, wherein the playing control information comprises playing progress information, and wherein the playing progress information is used to set a starting point of the playing.

11. A multimedia playing control apparatus, comprising:
a mobile terminal configured to:
obtain first multimedia content data according to source information of multimedia content data;
play the first multimedia content data;
determine, according to a progress of the playing, an unplayed portion of the first multimedia content, wherein the unplayed portion comprises a portion of the first multimedia content that has not been played; and
transmit (i) the source information of multimedia content data and (ii) the unplayed portion of the first multimedia content data as a buffer, such that the source information of multimedia content data and the unplayed portion of the first multimedia content data transmitted by the mobile terminal is received by a receiving unit;
wherein the receiving unit is configured to play the first multimedia content data based on the received unplayed portion of the first multimedia content data and based on the received source information, such that the receiving unit:
uses the received unplayed portion of the first multimedia content as a buffer; and
does not obtain according to the received source information the unplayed portion of the first multimedia content.

12. The multimedia playing control apparatus of claim 11, wherein the mobile terminal is further configured to receive source information of multimedia content data and the unplayed portion of first multimedia content data obtained according to the source information of multimedia content data.

13. The control method according to claim 1, wherein the source information of multimedia content data and the unplayed portion of the first multimedia content data is transmitted directly from the mobile terminal to the receiving unit.

14. The control method according to claim 6, wherein the source information of multimedia content data and the unplayed portion of the first multimedia content data is transmitted directly from the mobile terminal to the receiving unit.

15. The multimedia playing control apparatus of claim 11, wherein the source information of multimedia content data and the unplayed portion of the first multimedia content data is transmitted directly from the mobile terminal to the receiving unit.

* * * * *